United States Patent [19]

Stutzbach et al.

[11] Patent Number: 4,460,663
[45] Date of Patent: Jul. 17, 1984

[54] BATTERY CASING CONSTRUCTION AND METHOD OF MAKING SAME

[75] Inventors: Ronald J. Stutzbach, Smithfield; Richard J. B. Pearce, Cumberland, both of R.I.

[73] Assignee: SAB NIFE AB, Oskarshamn, Sweden

[21] Appl. No.: 456,530

[22] Filed: Jan. 7, 1983

[51] Int. Cl.³ .................... H01M 6/42; H01M 6/00
[52] U.S. Cl. .................... 429/151; 429/175; 429/176; 29/623.4
[58] Field of Search .................... 429/151, 175, 176; 29/623.4

[56] References Cited

U.S. PATENT DOCUMENTS

| | | | |
|---|---|---|---|
| 1,767,085 | 6/1930 | Marko | 429/175 |
| 2,832,815 | 4/1958 | Bremer et al. | 429/175 X |
| 3,338,452 | 8/1967 | Oakley et al. | 429/151 X |
| 3,647,556 | 3/1972 | Cox | 429/175 X |
| 3,871,924 | 3/1975 | Demattie et al. | 429/176 |

Primary Examiner—Brian E. Hearn
Assistant Examiner—Stephen J. Kalafut
Attorney, Agent, or Firm—Salter & Michaelson

[57] ABSTRACT

A battery casing construction comprises an extruded casing wall member, upper and lower collars which are snugly received on the wall member and bonded thereto adjacent the upper and lower ends thereof and top and bottom plate elements which are received in covering relation on the upper and lower ends of the wall member, respectively, and bonded thereto. The extruded wall member can be constructed with a reduced wall thickness to make the casing light weight and save on material costs whereas the collars and plate elements provide strength at the ends of the casing where it is needed. The method of forming the casing comprises the steps of forming the extruded wall member, forming the plate elements and collars, assembling the plate elements and collars on the wall member and bonding the plate elements and collars to the wall member.

8 Claims, 5 Drawing Figures

BATTERY CASING CONSTRUCTION AND METHOD OF MAKING SAME

BACKGROUND AND SUMMARY OF THE INVENTION

The instant invention relates to electrical storage batteries and more particularly to a casing construction for liquid electrolyte electrical storage batteries and to a method of making same.

Rechargeable electrical storage batteries are widely used in a number of applications to provide readily available electrical current for relatively short periods of time. In this regard, lead-acid storage batteries and nickel-cadmium-alkaline storage batteries have proven to be the most popular types of rechargeable liquid electrolyte storage batteries for most applications.

Virtually all liquid electrolyte storage batteries include outer casings which are adapted to effectively contain the electrolytes and other active components thereof. Such casings must be strong and durable and obviously highly resistant to electrolyte corrosion. Heavy duty industrial liquid electrolyte storage batteries are frequently designed to last for up to twenty years or more and hence the casings utilized in such batteries must be able to hold up for extended periods of time without electrolyte leakage. However, although such battery casings must be rugged and durable they are preferably constructed so that they are of relatively light weight to minimize material costs in the manufacture thereof as well as to minimize overall battery weight.

The closest prior art to the instant invention of which the applicant is aware is disclosed in the U.S. patents to Sherts, No. 2,202,675, Pahler, No. 2,603,670, Morgan, No. 2,692,906, Shannon, No. 3,261,719, Bingeman et al, No. 3,320,095, Hennigan, No. 3,390,017, Chookazion, No. 3,779,564, Schmidt, No. 3,884,725, Uba et al, No. 4,259,419 and Hardigg et al, No. 4,276,360. However, while these references show a variety of battery casing constructions, they do not teach a casing construction having the specific features of the casing of the instant invention, nor do they teach a method of making a casing in accordance with the method of the instant invention.

Heretofore the most commercialy feasible type of casing construction for liquid electrolyte storage batteries of the above described type has comprised an integrally molded jar portion comprising a bottom wall and upstanding side walls, and a lid portion which is received in covering relation on the jar portion and bonded thereto. It has heretofore proven to be necessary to construct battery casings in this manner to achieve the desired strength and durability without electrolyte leakage. However, when the jar portion of a battery is molded, the walls thereof must have a positive draft, i.e. they must be slightly inwardly tapered to allow the core of the mold to be removed after molding. This requires the use of a substantially greater amount of material than is necessary to achieve the desired jar strength. As a result, battery casings comprising integrally molded jar portions are generally heavier and more expensive than necessary. The excessive tooling costs for making molds for battery casings of this type have also represented a significant disadvantage of casings having molded jar portions.

The instant invention relates to a novel battery casing construction which is both durable and rugged but which is particularly adapted for light weight constructions and hence which can be economically constructed with a minimum amount of material. Specifically, the battery casing construction of the instant invention comprises an elongated extruded tubular casing wall member, upper and lower collars which are snugly received on the exterior of the wall member adjacent the upper and lower ends thereof, respectively, and bonded thereto, and top and bottom plate elements which are received in covering relation on the upper and lower ends of the wall member, respectively, and bonded thereto adjacent the upper and lower collars, respectively. The casing wall member is extruded and hence can be formed with a substantially reduced uniform wall thickness while the upper and lower collars and the top and bottom plate elements provide strength at the upper and lower ends of the casing where it is needed. The collars and the adjacent plate elements are bonded to the adjacent portions of the wall member to effectively seal the upper and lower ends of the casing. In the preferred embodiment of the casing construction, the wall member, the collars and the plate elements are made of a rigid thermoplastic material and the upper and lower collars and the top and bottom plate elements, respectively, cooperate with the adjacent portions of the wall member, respectively, to define enclosed bonding areas around the upper and lower ends of the casing. Bonding rings comprising the same thermoplastic material as the other components but with ferromagnetic particles intermixed therewith are provided in the bonding areas and are thermally bonded to the adjacent areas of the wall member and the respective plate elements and collars to secure the collars and plate elements on the wall member and to seal the upper and lower ends of the casing. It has been found that battery casings constructed in this manner require only approximately 40% as much plastic material in the manufacture thereof to achieve the necessary strength as casings having integrally molded jar portions. They are, however, equally as rugged and durable as molded battery casing constructions and they are highly resistant to leakage. Further, by utilizing an extruded casing wall member, the battery casing construction of the instant invention does not require complex molds for the manufacture thereof and hence the substantial tooling expenses associated with the making of such molds are eliminated.

The method of the instant invention also has substantial novelty and represents a significant development in the battery art. In accordance with the method of the instant invention, an elongated extruded tubular casing wall member is formed in a preferably rectangular configuration. Upper and lower collars, which are snugly receivable on the exterior of the casing wall member adjacent the upper and lower ends thereof, and top and bottom plate elements, which are receivable in covering relation on the upper and lower ends of the wall member, are also formed. The upper and lower collars and the top and bottom plate elements are then assembled on the wall member and bonded thereto to define an enclosed battery casing. In the preferred method the wall member, the top and bottom plate elements, and the upper and lower collars are made of a plastic material such as polyether sulfone and the top and bottom plate elements are formed so that they have peripheral channels therein, the channel in the top plate element facing downwardly and the channel in the bottom plate element facing upwardly. Upper and lower preliminary bonding rings comprising the same plastic material as the other components but with ferromagnetic particles intermixed therewith are received in the channels in the top and bottom plate elements, and the upper and lower ends of the wall member are received in the channels in the respective plate elements so that the ends of the wall member abut the bonding rings in the respective channels. The upper and lower collars are assembled on the wall member so that they cooperate with the adjacent plate elements and the adjacent portions of the wall member to define enclosed areas around the upper and lower ends of the wall member. The bonding rings are then melted by heating the ferromagnetic particles therein by induction heating and the top and bottom plate elements are pressed onto the wall member causing portions of the melted bonding rings to be forced outwardly from their respective channels and into pressurized contact with the adjacent areas of the wall member, the respective collars, and the respective plate elements. This produces tight, firm, durable bonds or welds which seal the upper and lower ends of the casing. Further, in the preferred method, the preliminary bonding rings and the channels are proportioned so that when the top and bottom plate elements are pressed onto the wall member causing portions of the melted bonding rings to be forced outwardly from the respective channels and along the wall member, the melted bonding ring material completely fills the enclosed bonding areas defined by the respective plate elements, collars and adjacent portions of the wall member. This insures pressurized bonding of the bonding rings to the plate elements, collars and wall member.

It is, therefore a primary object of the instant invention to provide a battery casing construction having an extruded wall member.

Another object of the instant invention is to provide a lightweight economical battery casing construction.

A further object of the instant invention is to provide a method of forming a battery casing construction having an extruded wall member.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
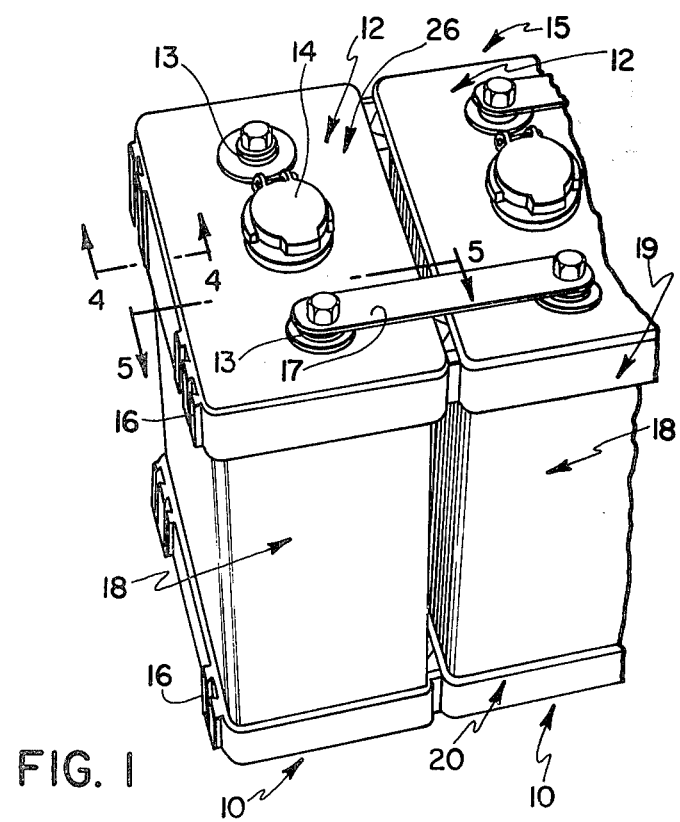
FIG. 1 is a perspective fragmented view of a multi-cell battery which comprises a plurality of individual battery cells which include the battery casing construction of the instant invention.
Figure 2:
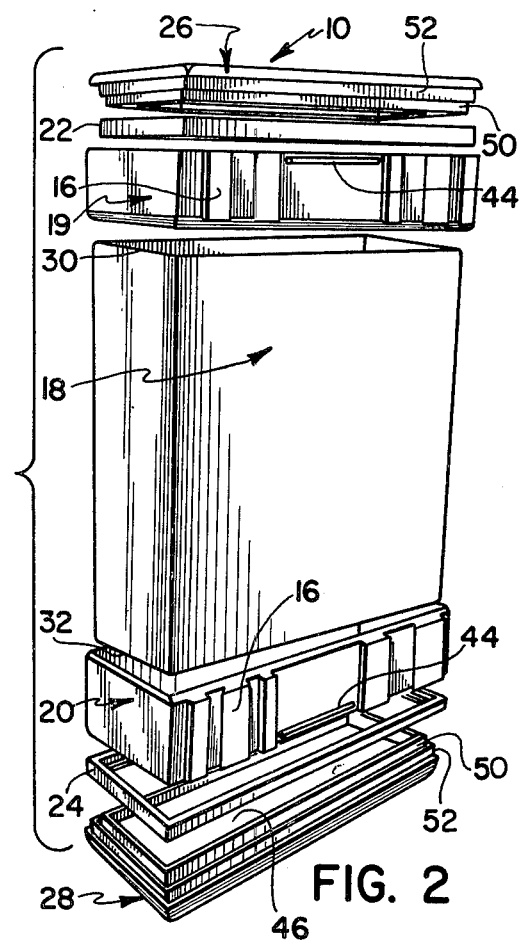
FIG. 2 is an exploded perspective view of the battery casing construction of the instant invention.
Figure 5:
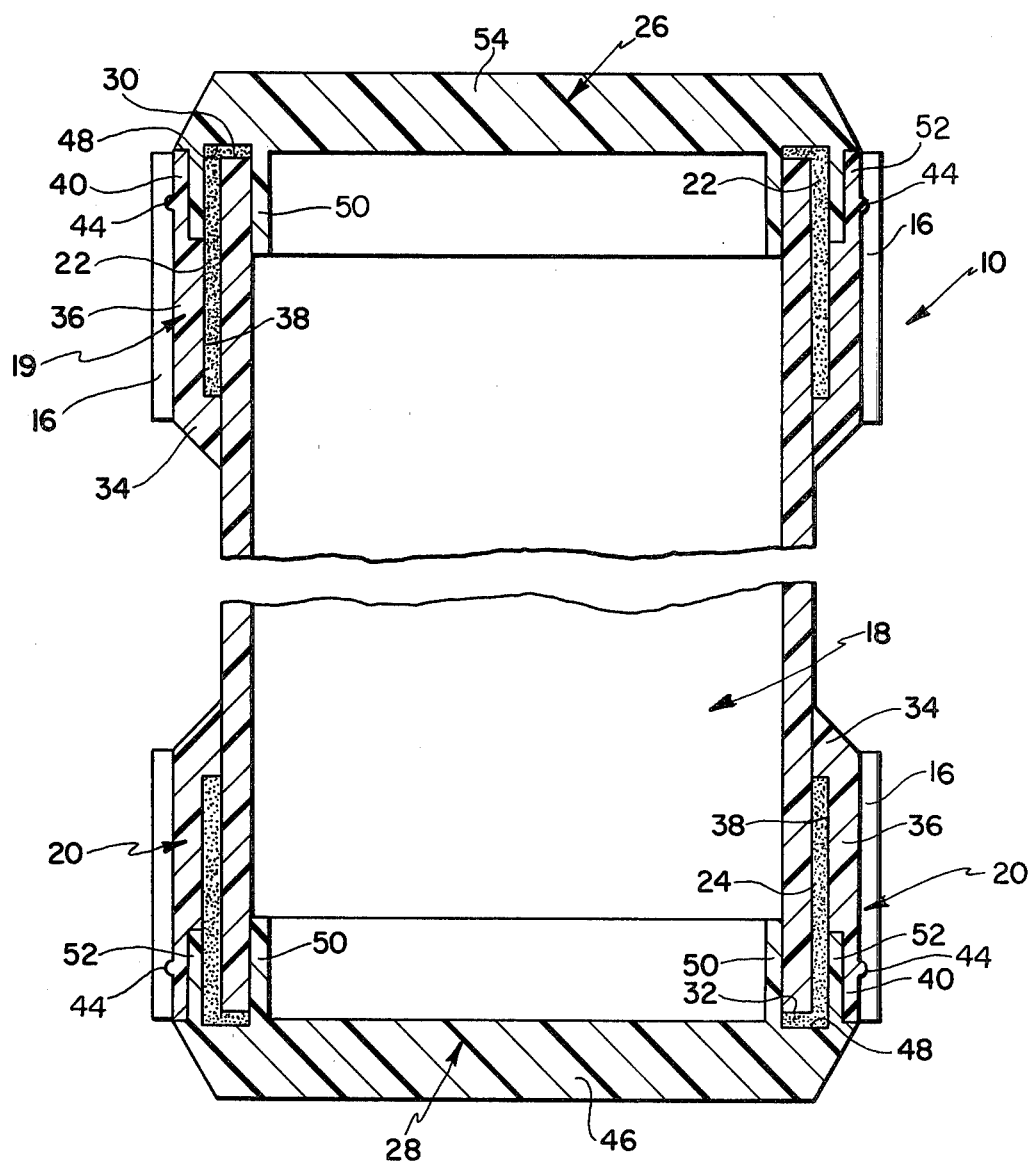
FIG. 5 is an enlarged fragmentary sectional view taken along line 5—5 in FIG. 1.

Referring now to the drawings, particularly FIGS. 1, 2 and 5, the battery casing construction of the instant invention is illustrated and generally indicated as 10. As illustrated in FIG. 1 the casing 10 comprises part of a battery cell generally indicated at 12 which has electrodes 13 and a vent cap 14 and which comprises a single cell of a multi-cell battery generally indicated at 15. The adjacent cells 12 of the battery 15 are detachably interconnected with coupling elements 16 and vertically retained in interconnected relation with connector bars 17 which also electrically interconnect the cells 12.

Referring now particularly to FIGS. 2 and 5, the casing 10 comprises an elongated extruded tubular wall member 18, upper and lower collars 19 and 20, respectively, upper and lower bonding rings 22 and 24, respectively, and top and bottom plate elements 26 and 28, respectively. In assembled relation the upper bonding ring 22 bonds the upper collar 19 on the exterior of the wall member 18 adjacent the upper end thereof and bonds the plate element 26 in covering relation on the upper end of the wall member 18. Similarly, the lower bonding ring 24 bonds the lower collar 20 on the wall member 18 adjacent the lower end thereof and bonds the bottom plate element 28 in covering relation on the lower end of the wall member 18.

The wall member 18 is preferably made of a suitable rigid thermoplastic material such as polyether sulfone and comprises an elongated extruded tubular member of preferably rectangular cross section having upper and lower ends 30 and 32, respectively. As illustrated most clearly in FIG. 5, because of its extruded construction, the wall member 18 is of uniform thickness. The wall member 18 preferably has a wall thickness of approximately 1/16 of an inch to reduce the overall weight of the casing 10 and to minimize material costs.

The upper and lower collars 19 and 20, respectively, are dimensioned to be snugly received on the wall member 18 adjacent the upper and lower ends thereof, respectively. To simplify manufacturing and assembly, the collars 19 and 20 are preferably identical and may be injection molded. The inner peripheries of the collars 19 and 20 are of stepped configuration as illustrated at 33, the collars 19 and 20 comprising bevelled foot portions 34 which are adapted to engage the outer surfaces of the wall member 18, body portions 36 having inner bonding surfaces 38 which are spaced slightly outwardly from the outer surfaces of the wall member 18 and recessed end portions 40 which are further outwardly spaced from the wall member 18. The coupling elements 16 are of preferably dovetaillike configuration and are preferably integrally molded in spaced groups on the collars 19 and 20, as illustrated. Ribs 44 are provided on the collars 19 and 20 between the groups of coupling elements 38 for securing a handle (not shown) on the casing 10. The collars 19 and 20 are also preferably made of a suitable rigid thermoplastic material, such as polyether sulfone.

The top and bottom plate elements 26 and 28 are also preferably made of a rigid thermoplastic material such as polyether sulfone as by injection molding. The bottom plate element 28 comprises a substantially rectangular flat bottom wall 46 and has a peripheral channel 48 therein which is defined by inner and outer channel walls 50 and 52, respectively. The top plate element 26 is similar in configuration to the bottom plate element 28 but comprises a top wall 54 which is adapted to receive the electrodes 13 and the vent cap 14. The top plate element 26 also has a peripheral channel 48 therein which faces downwardly and which is defined by inner and outer channel walls 50 and 52, respectively.

The upper and lower bonding rings 22 and 24, respectively, comprise rings of bonding material for bonding the plate elements 26 and 28 and the collars 19 and 20 to the wall member 18. In this regard, although the bonding rings 22 and 24 may be of various types of adhesive materials, they are preferably made of a rigid thermoplastic material with particles of a ferromagnetic material such as iron or stainless steel intermixed therewith, the plastic material preferably being the same material as that used in the wall member 18, the plate elements 26 and 28 and the collars 19 and 20. The bonding rings 22 and 24 are preferably thermally bonded or welded to the wall member 18, the adjacent plate elements 26 and 28 and the adjacent collars 19 and 20 through induction heating of the ferromagnetic particles therein. This general bonding technique is disclosed in the U.S. patent to Guglieimo, No. 3,620,875.

Referring now particularly to FIG. 5, the components of the battery casing 10 are illustrated in assembled relation. As will be seen, the top plate element 26 is received on the upper end 30 and the upper collar 19 is assembled with the top plate element 26 adjacent the upper end 30. In this regard, the upper end 30 is received in the channel 48 in the plate element 26 so that the inner surface of the upper portion of the wall member 18 abuts the inner channel wall 50. The collar 19 is assembled with the plate element 26 so that the outer channel wall 52 is received in the recessed end portion 40. When assembled in this manner, the top plate element 26 and the collar 19 cooperate with the wall member 18 to define an enclosed area adjacent the upper end 30 wherein the upper bonding ring 22 is received. As illustrated, the upper bonding ring 22 is of L-shaped configuration so that it extends along the upper edge of the upper end 30 and downwardly a distance along the outer surface of the wall member 18. The bonding ring 22 is preferably thermally bonded to the wall member 18, the collar 19 and the plate element 26 and fills the enclosed area thereby defined. Further, since the ring 22 extends a distance along the outer surface of the wall member 18, along the bonding surface 38 and along the inner surface of the outer channel wall 52, a substantial amount of contact area is provided to insure an effective and strong hermetic seal on the upper end of the casing 10. It should be pointed out that by providing bonding along the outer surface of the casing wall member 18 as opposed to merely on the upper edge of the upper end 30, the bonding area of the upper edge of the upper end 30 is relatively insignificant in the overall strength of the bond and hence the wall member 18 can be manufactured with a reduced wall thickness. The bottom plate element 28 and the lower collar 20 are similarly received on the wall member 18 adjacent the lower end 32 thereof and the lower bonding ring 24 bonds the lower collar 20 and the bottom plate element 28 to the wall member 18.

When the collars 19 and 20 and the plate elements 26 and 28 are assembled on the wall member 18 as above described, they provide strength in the casing 10 at the upper and lower ends thereof where it is needed. For cosmetic reasons, the plate elements 26 and 28 and the collars 19 and 20 are preferably opaque and colored as desired whereas the wall member 18 is preferably transparent or translucent to permit viewing of the electrolyte level in the cell 12. In this connection, however, the upper collar 19 and the wall member 18 are preferably dimensioned so that the maximum electrolyte level in the cell 12 is below the bottom edge of the collar 19 to permit viewing of said level.

The method of the instant invention is carried out by extruding the casing wall member 18 and forming the upper and lower collars 19 and 20, respectively, and the top and bottom plate elements 26 and 28, respectively, preferably in the configurations hereinabove set forth. Thereafter the collars 19 and 20 and the plate elements 26 and 28 are assembled on the wall member 18 and bonded thereto to define the enclosed storage battery casing 10.

In the preferred form of the method of the instant invention the wall member 18, the collars 19 and 20, and the plate elements 26 and 28 are made of a thermoplastic material such as polyether sulfone and they are thermally bonded together using bonding rings comprising the same plastic material but with ferromagnetic particles intermixed therewith. Specifically, the bonding rings are melted by induction heating of the ferromagnetic particles therein to achieve the desired bonds.

Figure 3:
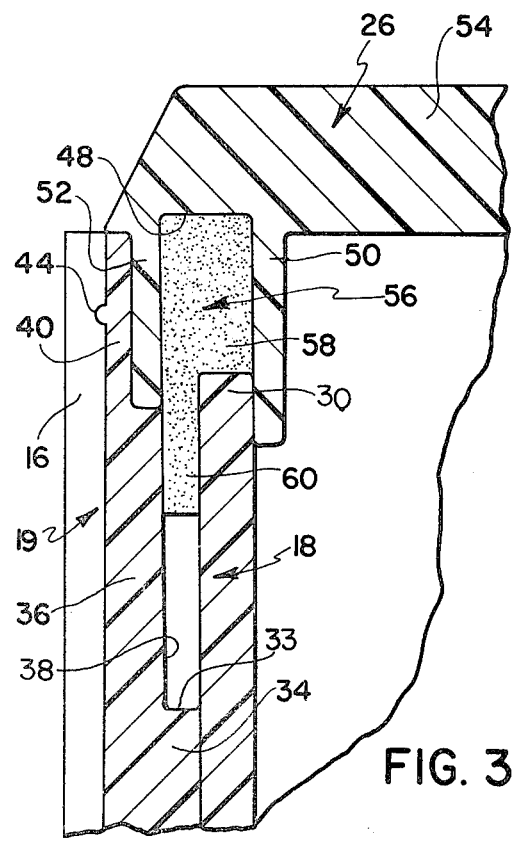
FIG. 3 is an enlarged fragmentary sectional view of the top plate element, the upper collar, the preliminary upper bonding ring and the upper end of the casing wall member prior to the assembly thereof.
Figure 4:
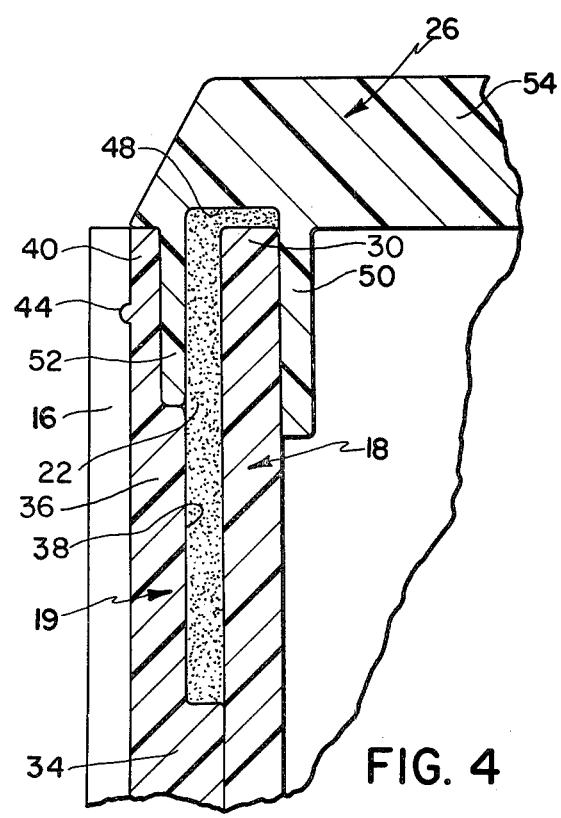
FIG. 4 is a sectional view taken along line 4—4 in FIG. 1.

Referring particularly to FIGS. 3 and 4 the assembly and bonding of the top plate element 26 and the upper collar 19 to the wall member 18 is illustrated. In this regard a preliminary bonding ring 56 which is made of the same thermoplastic material as the wall member 18, the plate element 26 and the collar 19 and has particles of a ferromagnetic material, such as iron or stainless steel, intermixed therewith is positioned in the channel 48. The preliminary ring 56 comprises an enlarged body portion 58 and a leg portion 60 which extends therefrom, the body portion 58 being adapted to substantially fill the inner portion of the channel 48 as illustrated in FIG. 3. The wall member 18 is then assembled with the plate element 26 and the collar 19 so that it is disposed inwardly of the leg portion 60 and abuts the body portion 58. Thereafter the preliminary ring 56 is melted by induction heating of the ferromagnetic particles therein in accordance with the aforesaid U.S. patent to Guglieimo, No. 3,620,875 and the plate element 26 is pressed further onto the wall member 18 to the position illustrated in FIG. 4. When the plate element 26 is pressed onto the wall member 18 in this manner, the material comprising the preliminary ring 56 is forced out of the channel 48 and along the outer side of the wall member 18 to form the upper bonding ring 22 which fills the entire enclosed area defined by the wall member 18, the plate element 26 and the collar 19. Since the upper bonding ring 22 fills this entire enclosed area, when the plate element 26 is pressed onto the wall member 18, pressurized contact between the melted bonding ring 22 and the plate element 26, the collar 19 and the wall member 18 is achieved to effect positive thermal bonding or welding therebetween. The assembly and bonding of the bottom plate element 28 and the lower collar 20 on the lower end 32 of the wall member 18 with the lower bonding ring 24 is effected in a similar manner to hermetically seal the lower end of the casing 10.

It is seen, therefore, that the instant invention provides an effective, light weight, relatively inexpensive battery casing construction which is both rugged and durable. As a result of utilizing an extruded wall member in the casing 10, substantial savings in material costs can be realized without sacrificing strength and durability. The upper and lower collars 19 and 20 and the top and bottom plate elements 26 and 28 provide strength where it is needed at the upper and lower ends of the casing 10, respectively, and provide supporting structure for bonding and sealing the upper and lower ends of the casing 10. The battery casing construction can effectively be used for individual cells of a multicell battery such as the battery 15, and in this regard, the adjacent cells 12 are detachably interconnectable with the coupling elements 16 simply by sliding the adjacent cells 12 to interengage the coupling elements 16 thereof and securing the cells 12 in position with the bars 17. When the adjacent cells 12 are interconnected in this manner, the wall members 18 thereof are in slightly spaced relation to provide ventilation therebetween and the cells 12 are easily detachable for the replacement thereof. Accordingly, it is seen that the battery casing construction of the instant invention represents a significant advancement in the battery art which has substantial commercial significance. The instant invention also provides an effective method of forming a battery casing having an extruded wall member and provides an effective method of securing the top and bottom plate elements of the casing to the extruded wall member thereof to seal the upper and lower ends of the casing. Accordingly, it is seen that the method of the instant invention also represents a significant improvement in the art which has substantial commercial merit.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A battery casing construction comprising an elongated extruded tubular casing wall member having elongated walls which are substantially straight along the entire extents thereof and made of a substantially rigid plastic material, molded upper and lower collars snugly received on the exterior of said wall member adjacent the upper and lower ends thereof, respectively, molded top and bottom plate elements received in covering relation on the upper and lower ends of said wall member, respectively, said top and bottom plate elements having peripheral channels therein which face downwardly and upwardly, respectively, the upper and lower portions of said wall member being received in the channels in said top and bottom plate elements, respectively, said upper and lower collars and said top and bottom plate elements, respectively, cooperating with the adjacent portions of said wall member to define enclosed bonding areas at the upper and lower ends of said wall member which encompass the outboard portions of the respective channels and extend distances downwardly and upwardly, respectively, along the outer surfaces of said wall member at the upper and lower ends thereof, respectively, the lower extremity of said upper bonding area being defined by said upper collar, the upper extremity of said lower bonding area being defined by said lower collar, and upper and lower bonding means in said upper and lower bonding areas, respectively, adhesively bonding said upper and lower collars and said top and bottom plate elements, respectively, to the outer surfaces of said wall member adjacent the upper and lower ends thereof, respectively.

2. In the casing construction of claim 1, the upper and lower portions of said wall members abutting the adjacent inboard surfaces of the respective channels and being in spaced relation to the adjacent outboard surfaces of the respective channels, said upper and lower bonding means comprising upper and lower bonding rings in said upper and lower bonding areas, respectively, said bonding rings bonding said upper and lower collars and said top and bottom plate elements to said wall member.

3. In the casing construction of claim 2, said rings filling the respective enclosed bonding areas.

4. In the casing construction of claim 3, said bonding rings being of L-shaped cross sectional configuration, the shorter legs of said L-shaped rings extending inwardly along the adjacent ends of said wall member, the longer legs thereof extending along the outer surfaces of the respective portions of the wall member adjacent thereto.

5. In the casing construction of claim 4, said bonding rings being thermally bonded to the respective plate elements, collars and portions of said wall member adjacent thereto.

6. A method of forming a casing for a battery and the like comprising:
   a. forming a substantially straight elongated tubular casing wall member having elongated walls which are substantially straight along the entire extents thereof;
   b. forming molded top and bottom plate elements having peripheral channels therein which are receivable on the upper and lower ends of said wall member with the upper and lower portions of said wall member received in the channels in said top and bottom plate elements, respectively;
   c. forming molded upper and lower collars which are snugly receivable on the exterior of said casing wall member adjacent the upper and lower ends thereof, respectively, so that they cooperate with said top and bottom plate elements, respectively, to define enclosed bonding areas at the upper and lower ends of said wall member which encompass the outboard portions of the respective channels and extend distances downwardly and upwardly, respectively, along the outer surfaces of said wall member at the upper and lower ends thereof, respectively, and so that the lower extremity of said upper bonding area is defined by said upper collar and the upper extremity of said lower bonding area is defined by said lower collar;
   d. assembling said upper collar on said wall member adjacent the upper end thereof, said top plate element in covering relation on the upper end of said wall member, said lower collar on said wall member adjacent the lower end thereof, and said bottom plate element in covering relation on the lower end of said wall member to define said upper and lower enclosed bonding areas;
   e. applying an adhesive bonding material in said bonding areas during the assembly of said top and bottom plate elements and said upper and lower collars on said wall member; and
   f. adhesively bonding said upper and lower collars and said top and bottom plate elements to said wall member with said bonding material.

7. In the method of claim 6, said applying step comprising assembling preliminary upper and lower softened adhesive bonding rings in the channels in said top and bottom plate elements, respectively, said assembling step further characterized in that said top and bottom plate elements are assembled on said wall member so that the upper and lower ends of said wall member abut the respective preliminary bonding rings, said bonding step comprising pressing said top and bottom plate elements onto said casing wall member so that they force the respective bonding rings into pressurized contact with the respective plate elements, collars and portions of said wall member adjacent thereto and so that said upper and lower bonding areas are filled by the respective bonding rings.

8. In the method of claim 6, said wall member, said upper and lower collars and said top and bottom plate elements being made of a substantially rigid thermoplastic material, said preliminary bonding rings comprising said thermoplastic material with ferromagnetic particles intermixed therewith, said applying step comprising assembling preliminary upper and lower bonding rings in the channels in said top and bottom plate elements, respectively, said assembling step further characterized in that said top and bottom plate elements are assembled on said wall member so that the upper and lower ends of said wall member abut the respective preliminary bonding rings, said bonding step comprising melting said bonding rings by induction heating of said ferromagnetic particles and pressing said top and bottom plate elements onto said casing wall member so that they force the respective melted bonding rings into pressurized contact with the respective plate elements, collars and portions of said wall member adjacent thereto and so that said upper and lower bonding areas are filled by the respective bonding rings.

* * * * *